US012118957B2

(12) United States Patent
Kim et al.

(10) Patent No.: US 12,118,957 B2

(45) Date of Patent: Oct. 15, 2024

(54) DATA DRIVING DEVICE, METHOD AND SYSTEM FOR DRIVING DISPLAY DEVICE

(71) Applicant: SILICON WORKS CO., LTD., Daejeon (KR)

(72) Inventors: Do Seok Kim, Daejeon (KR); Yong Hwan Mun, Daejeon (KR); Myung Yu Kim, Daejeon (KR); Hyun Pyo Cho, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 251 days.

(21) Appl. No.: 17/343,526

(22) Filed: Jun. 9, 2021

(65) Prior Publication Data

US 2021/0390924 A1 Dec. 16, 2021

(30) Foreign Application Priority Data

Jun. 15, 2020 (KR) ........................ 10-2020-0072284

(51) Int. Cl.

*G09G 3/36* (2006.01)
*G09G 3/20* (2006.01)
*G09G 5/00* (2006.01)

(52) U.S. Cl.

CPC ............... *G09G 5/008* (2013.01); *G09G 3/20* (2013.01); *G09G 2310/0275* (2013.01)

(58) Field of Classification Search

CPC ... G09G 5/008; G09G 3/20; G09G 2310/0275
See application file for complete search history.

(56) References Cited

U.S. PATENT DOCUMENTS

| | | | | |
|---|---|---|---|---|
| 8,878,828 | B2 | 11/2014 | Baek et al. | |
| 2004/0239602 | A1* | 12/2004 | Kim | G09G 3/3611 345/87 |
| 2005/0168420 | A1* | 8/2005 | Chung | G09G 5/006 345/87 |
| 2013/0076703 | A1 | 3/2013 | Baek et al. | |
| 2020/0090616 | A1* | 3/2020 | Duan | G09G 3/3685 |
| 2020/0098330 | A1* | 3/2020 | Pyun | G06F 1/08 |
| 2020/0126508 | A1* | 4/2020 | Kim | G06F 1/08 |

FOREIGN PATENT DOCUMENTS

| | | |
|---|---|---|
| KR | 10-2015-0109569 A | 10/2015 |
| KR | 10-1885186 B1 | 8/2018 |

* cited by examiner

*Primary Examiner* — Roy P Rabindranath

(74) *Attorney, Agent, or Firm* — ROTHWELL, FIGG, ERNST & MANBECK, P.C.

(57) ABSTRACT

The present disclosure relates to a data driving device, a method, and a system for driving a display device, and more particularly, it relates to a data driving device, a method, and a system to provide an internal operation state of the data driving device in response to a request of the data processing device when the display device is driven.

20 Claims, 10 Drawing Sheets

DATA DRIVING DEVICE, METHOD AND SYSTEM FOR DRIVING DISPLAY DEVICE

CROSS REFERENCE TO RELATED APPLICATION

This application claims priority from Republic of Korea Patent Application No. 10-2020-0072284, filed on Jun. 15, 2020, which is hereby incorporated by reference in its entirety.

BACKGROUND

1. Field of Technology

The present disclosure relates to a data driving device, a method, and a system for driving a display device.

2. Description of the Prior Art

A display panel comprises a plurality of pixels disposed in a form of a matrix and each pixel comprises a red (R) sub-pixel, a green (G) sub-pixel, a blue (B) sub-pixel, or the like. Each sub-pixel emits light according to a greyscale value included in image data to display an image on the display panel.

Image data is transmitted from a data processing device, referred to as a timing controller, to a data driving device, referred to as a source driver Image data is transmitted in digital values and the data driving device converts the image data into an analog voltage to drive each sub-pixel.

Since image data separately or independently indicates each greyscale value for each pixel, as the number of pixels disposed in a display panel increases, the amount of image data increases. In addition, as a frame rate increases, the amount of image data to be transmitted within a unit time increases.

Since display panels have much higher resolutions recently, the number of pixels disposed in a display panel and a frame rate has increased. In addition, in order to process the increased amount of image data, the data transmission rate in a display device increased.

Meanwhile, in an initial drive of a data processing device and a data driving device, that is, right after power is applied to a display device, a high-speed communication environment for data transmission between the data processing device and the data driving device needs to be set.

Here, since, in a case when a process for a configuration of a high-speed communication environment is performed using a high-speed data communication, there could be errors due to the high speed, a process for a configuration of a high-speed communication environment is performed using a low-speed data communication having a lower communication frequency than that of the high-speed data communication.

After performing a low-speed data communication with the data processing device, that is, performing a process for a configuration of a high-speed communication environment, the data driving device synchronizes a communication clock by a clock training.

After completing the clock training, the data processing device may transmit an image data signal to the data driving device in a high-speed data communication so that the data driving device may display an image on the display panel. That is, the display device may operate normally.

Meanwhile, the data processing device may receive a lock signal from the data driving device while the display device operates and check an operation state of the data driving device by identifying the level of a voltage of the lock signal.

Here, the lock signal may have a high level or a low level. When the lock signal has a high level, the data processing device may determine that the operation state of the data driving device is normal and when the lock signal has a low level, the data processing device may determine that the operation state of the data driving device is abnormal.

Generally, in a display device, one data processing device performs communication with a plurality of data driving devices.

In order that a data processing device smoothly performs data communication with a plurality of data driving devices, the data processing device needs to exactly identify the operation state of each data driving device.

However, according to conventional arts, a data processing device simply determines, using a lock signal, if the operation state of a data driving device is normal or abnormal, but cannot exactly determine the operation state of each data driving device.

SUMMARY OF THE INVENTION

In this background, an aspect of the present disclosure is to provide a technology in which a data driving device provides an internal operation state to a data processing device in response to a request of the data processing device while a display device operates.

To this end, in an aspect, the present disclosure provides a method of driving a data driving device comprising: an image receiving step to receive an image data signal from a data processing device through a first communication line; a first transmission step to transmit a lock signal of a predetermined level through a second communication line; a command receiving step to receive a state reply command signal from the data processing device while receiving the image data signal; and a second transmission step to transmit an operation state signal including operation state data representing an operation state inside the data driving device, instead of the lock signal of a predetermined level, through the second communication line.

The method may further comprise, before the image receiving step, a step of optimizing a set value of a clock recovery circuit, comprised in a circuit to receive the image data signal, according to a frequency of the image data signal.

An optimized set value may comprise any one of a reference current value, a reference voltage value, and a gain adjustment value of an oscillator comprised in the clock recovery circuit and the operation state data may comprise the optimized set value.

The method may further comprise, before the image receiving step, a step of optimizing a set value of an equalizer, comprised in the circuit to receive the image data signal, according to a characteristic of the first communication line.

An optimized set value may comprise a gain level of the equalizer and the operation state data may comprise the optimized set value.

In the command receiving step, the data driving device may receive the image data signal by frame and may receive the state reply command signal in a frame control section between a frame and another frame.

The data driving device may repeatedly perform the second transmission step N (N is a natural number) times from right after receiving the state reply command signal until another frame control section starts and subsequently transmit again the lock signal of a predetermined level through the second communication line.

In the second transmission step, the data driving device may encode the operation state data into the operation state signal using a Manchester code.

The operation state signal may comprise a preamble in which a Manchester code corresponding to any one of binary numerals is repeated M (M is a natural number equal to or higher than 2), a start bit disposed after the preamble, the operation state data disposed after the start bit, and an end bit disposed after the operation state data.

In the second transmission step, the data driving device may perform an AND operation with respect to the lock signal of a predetermined level received from an external device and the operation state signal and transmit the operation state signal obtained by the AND operation through the second communication line.

In another aspect, the present disclosure provides a data driving device comprising: a communication circuit to receive an image data signal from a data processing device through a first communication line, to receive a state reply command signal from the data processing device while receiving the image data signal, and to process the state reply command signal into state reply command information; a lock control circuit to output a lock signal of a first level when the communication circuit receives the image data signal; and a logic gate to transmit an operation state signal regarding an operation state of the communication circuit, instead of the lock signal of the first level, through the second communication line connected with the output terminal when receiving the state reply command information from the communication circuit.

The data driving device may further comprise a signal selecting circuit to output the lock signal of the first level to the logic gate when receiving only the lock signal of the first level and to output the operation state signal to the logic gate when receiving the operation state signal and the lock signal of the first level.

The logic gate may be an AND gate and when receiving the operation state signal from the signal selecting circuit through an input terminal and a lock signal of the first level from an external device through the second communication line connected to another input terminal, the AND gate may perform an AND operation with respect to the operation state signal and the lock signal from an external device and transmit an operation state signal obtained by the AND operation through the second communication line connected with the output terminal.

The logic gate may be an AND gate and when receiving the operation state signal from the signal selecting circuit through an input terminal and a lock signal of a second level from an external device through the second communication line connected to another input terminal, the AND gate may perform an AND operation with respect to the operation state signal and the lock signal from an external device and transmit a lock signal from an external device obtained by the AND operation through the second communication line connected with the output terminal.

The data driving device may further comprise a communication control circuit. The communication circuit may comprise a clock recovery circuit and an equalizer and the communication control circuit may optimize a set value of an oscillator comprised in the clock recovery circuit according to a frequency of the image data signal before the communication circuit receives the image data signal and optimize a gain level of the equalizer according to a characteristic of the first communication line.

The operation state signal may comprise the set value of the oscillator and the gain level of the equalizer.

In still another aspect, the present disclosure provides a system comprising: a first data driving device to receive a first image data signal through a 1-1st communication line, to transmit a first lock signal through a 2-1st communication line, and to transmit an operation state signal representing an operation state inside the first data driving device, instead of the first lock signal through the 2-1st communication line when receiving state reply command signal while receiving the first image data signal; a second data driving device to receive a second image data signal through a 1-2nd communication line, to generate a second lock signal, to receive the first lock signal through the 2-1st communication line, to perform a logical operation with respect to the first lock signal and the second lock signal, to transmit a signal obtained by the logical operation through a 2-2nd communication line, to receive the operation state signal through the 2-1st communication line, to perform a logical operation with respect to the operation state signal and the second lock signal, and to transmit an operation state signal obtained by the logical operation through the 2-2nd communication line; and a data processing device to transmit the first image data signal through the 1-1st communication line, the second image data signal through the 1-2nd communication line, and the state reply command signal through the 1-1st communication line and subsequently to receive the operation state signal through the 2-2nd communication line.

The data processing device may transmit a level fixation command signal to fix the level of the second lock signal through the 1-2nd communication line when transmitting the state reply command signal through the 1-1st communication line.

The second data driving device may fix the level of the second lock signal to be high when receiving the level fixation command signal through the 1-2nd communication line.

The second data driving device may change the level of the second lock signal to be low when there is an error in receiving the second image data signal in a state where the lock signal is fixed in a high level, perform a logical operation with respect to the operation state signal and the second lock signal of a low level, and transmit a signal of a low level obtained by the logical operation through the 2-2nd communication line.

As described above, according to the present disclosure, it is possible that a data processing device may check operation states of a plurality of data driving devices, and therefore, the data processing device may efficiently manage the plurality of data driving devices.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
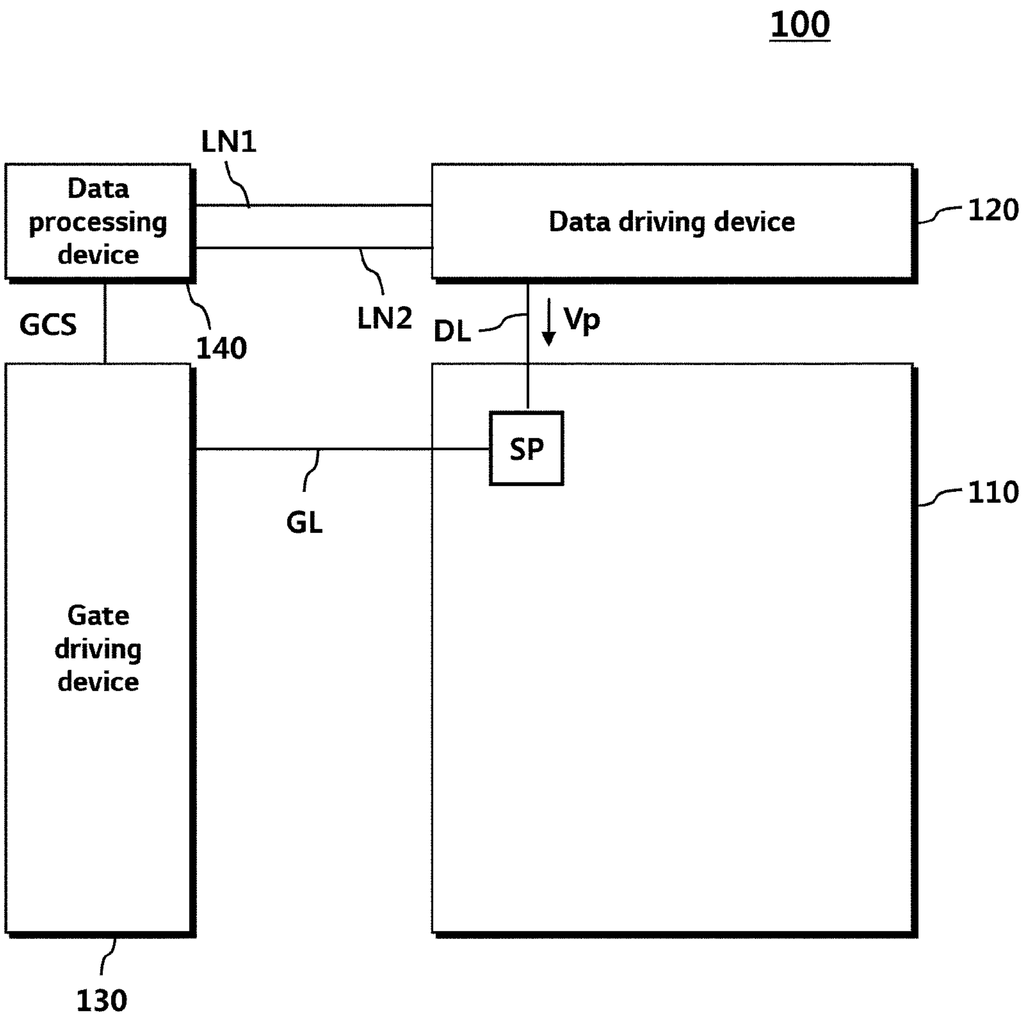
FIG. 1 is a configuration diagram of a display device according to an embodiment.

FIG. 1 is a configuration diagram of a display device according to an embodiment.

Referring to FIG. 1, a display device 100 may comprise a display panel 110, a data driving device 120, a gate driving device 130, and a data processing device 140.

On the display panel 110, a plurality of data lines DL and a plurality of gate lines GL may be disposed and a plurality of pixels may also be disposed. A pixel may comprise a plurality of sub-pixels SP. Sub-pixels may be a red (R) sub-pixel, a green (G) sub-pixel, a blue (B) sub-pixel, and a white (W) sub-pixel. A pixel may comprise RGB sub-pixels SP, RGBG sub-pixels SP, or RGBW sub-pixels SP.

The data driving device 120, the gate driving device 130, and the data processing device 140 are to generate signals for displaying images on the display panel 110.

The gate driving device 130 may supply a gate driving signal, such as a turn-on voltage or a turn-off voltage, through a gate line GL. When a gate driving signal of a turn-on voltage is supplied to a sub-pixel SP, the sub-pixel SP is connected with a data line DL. When a gate driving signal of a turn-off voltage is supplied to the sub-pixel SP, the sub-pixel SP is disconnected from the data line DL. The gate driving device 130 may be referred to as a gate driver.

The data driving device 120 may supply a data voltage Vp to a sub-pixel SP through a data line DL. A data voltage Vp supplied through a data line DL may be supplied to a sub-pixel SP according to a gate driving signal. The data driving device 120 may be referred to as a source driver (SD-IC).

The data driving device 120 may comprise at least one integrated circuit, and this at least one integrated circuit may be connected to a bonding pad of a display panel 110 in a tape automated bonding (TAB) method or a chip-on-glass (COG) method, directly formed on a display panel 110, or integrated on a display panel 110 depending on a case. In addition, a data driving device 120 may be formed in a chip-on-film (COF) type.

According to an embodiment, when driving voltages VCC are supplied to the data driving device 120 and the data processing device 140, the data driving device 120 may perform a low-speed communication with the data processing device 140 in order to set up a high-speed communication environment therebetween.

In other words, the data driving device 120 may receive a set value data signal for the high-speed communication environment from the data processing device 140 in a low-speed communication. Here, the data driving device 120 may receive the set value data signal in a CFG data section in FIG. 5. According to an embodiment, set value data included in the set value data signal may include a basic gain level of an equalizer comprised in the data driving device 120, scramble information, line polarity information, or the like. Here, the scramble information may comprise information about whether or not data is scrambled when the data processing device 140 transmits the data to the data driving device 120 and the line polarity information may comprise information indicating the polarity of a first line of a pixel.

The data driving device 120 may set up the high-speed communication environment using the set value data and store the set value data. Here, the data driving device 120 may store the set value data in a memory circuit (not shown) comprised therein. The memory circuit (not shown) of the data driving device 120 may comprise at least one of a register and a random access memory (RAM).

Meanwhile, the data driving device 120 may receive a clock pattern for a low-speed communication from the data processing device 140 in a Preamble section disposed before the CFG data section and perform a clock training for the low-speed communication. The data driving device 120 may receive the set value data signal and the clock pattern for the low-speed communication through a first communication line LN1. Here, a clock training may be a process of synchronizing an internal clock of the data driving device 120 with a communication clock.

When a clock training for the low-speed communication is normally completed, the data driving device 120 may transmit a lock signal of a first level, indicating that a communication state is stable, to the data processing device 140. Here, the first level may be a high one (a high voltage level). The lock signal of the first level may be transmitted through a second communication line LN2.

As described above, after performing the clock training for the low-speed communication and setting up the high-speed communication environment by performing the low-speed communication with the data processing device, the data driving device 120 may perform a high-speed communication with the data processing device.

Figure 5:
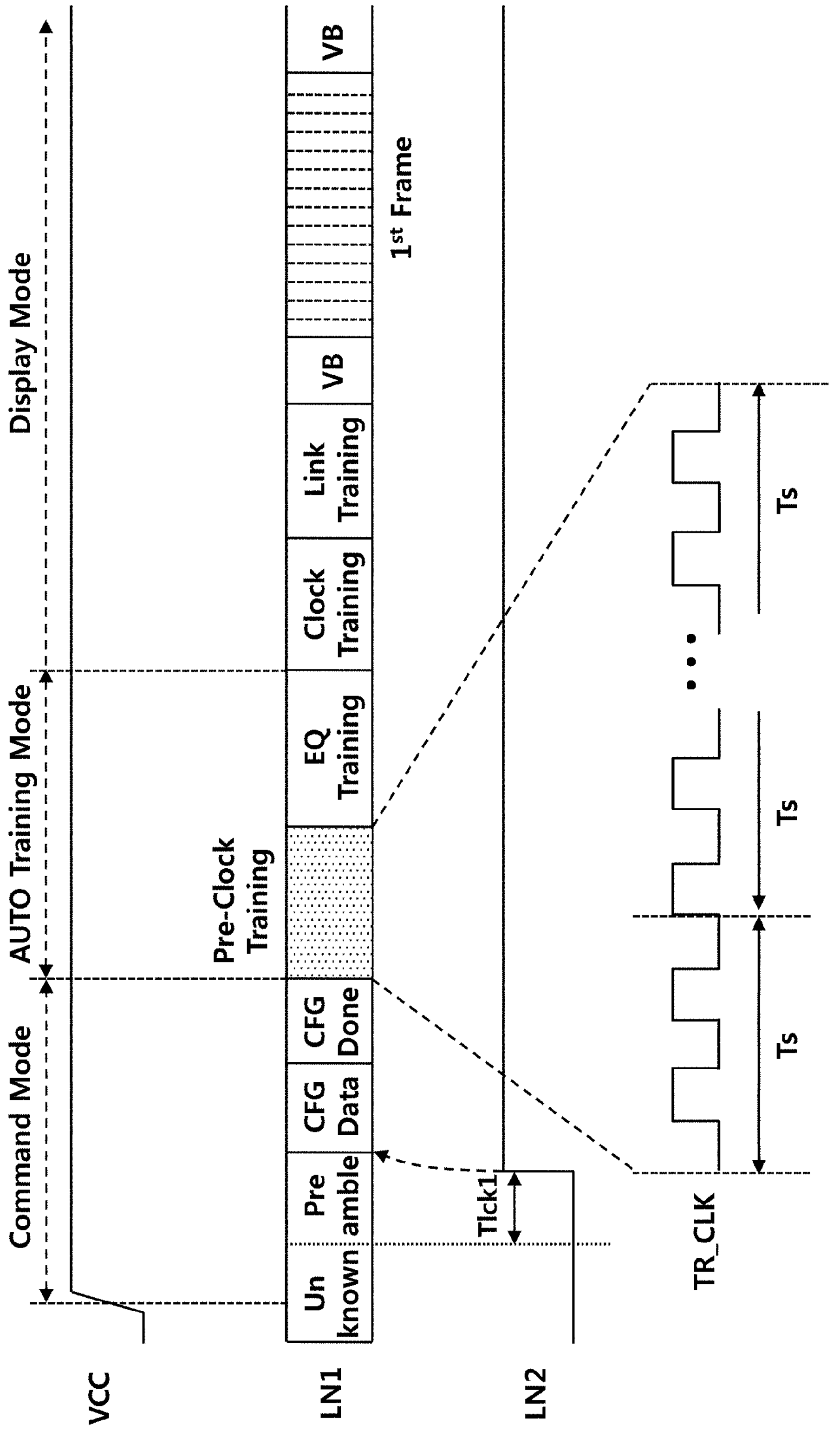
FIG. 5 and FIG. 6 are diagrams illustrating sequences of data transmission through a first communication line according to an embodiment.

For example, in a Display mode section of FIG. 5, the data driving device 120 may receive an image data signal from the data processing device 140 through the high-speed communication with the data processing device 140. Here, the image data signal may be transmitted or received through the first communication line LN1.

Before receiving an image data signal, the data driving device 120 may optimize a set value of a clock recovery circuit in a high-speed communication circuit, to receive the image data signal, according to a frequency of a high-speed communication, that is, a frequency of the image data signal.

The data driving device may also optimize a set value of an equalizer comprised in the high-speed communication circuit according to a characteristic of the first communication line LN1.

A detailed description in this regard will be made below referring to FIG. 5 and FIG. 6.

The data processing device 140 may supply control signals to the gate driving device 130 and the data driving device 120. For example, the data processing device 140 may transmit a gate control signal GCS to initiate a scan to the gate driving device 130, transmit an image data signal to the data driving device 120, and transmit a data control signal DCS to control the data driving device 120 to supply a data voltage Vp to each sub-pixel SP. The data processing device 140 may be referred to as a timing controller (T-CON).

Figure 2:
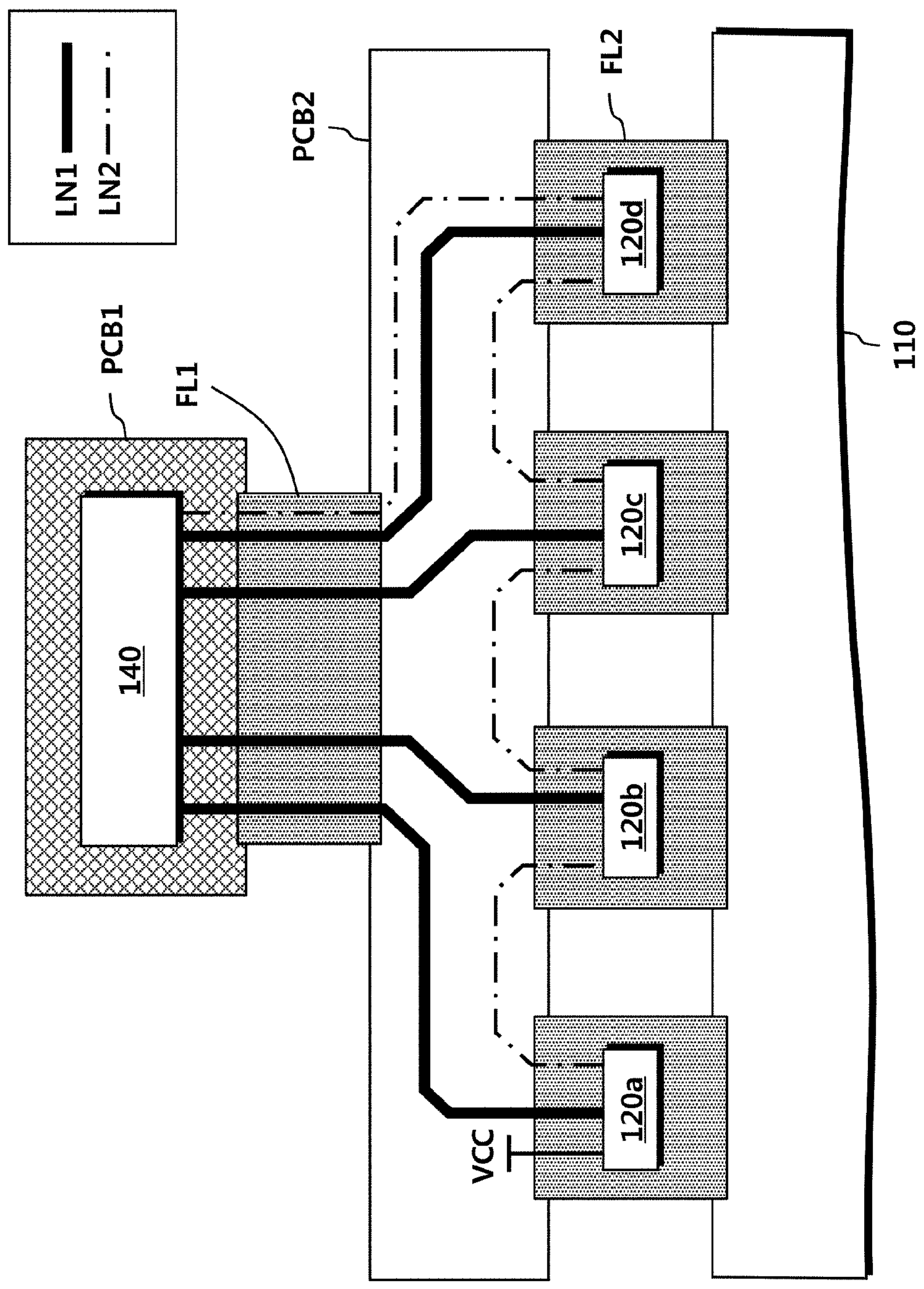
FIG. 2 is a diagram schematically illustrating a configuration of a system according to an embodiment.

FIG. 2 is a diagram schematically illustrating a configuration of a system according to an embodiment.

Referring to FIG. 2, a system may comprise at least one data processing device 140 and a plurality of data driving devices 120*a*, 120*b*, 120*c*, 120*d*.

The data processing device 140 may be disposed on a first printed circuit board PCB1 and connected with the plurality of data driving devices 120*a*, 120*b*, 120*c*, 120*d* through first communication lines LN1 and second communication lines LN2.

The first communication lines LN1 and the second communication lines LN2 may reach the plurality of data driving devices 120*a*, 120*b*, 120*c*, 120*d* via the first printed circuit board PCB1 and a second printed circuit board PCB 2. The first printed circuit board PCB1 and the second printed circuit board PCB2 may be connected with each other by a first film FL1 made of a flexible material. The first communication lines LN1 and the second communication lines LN2 may extend from the first printed circuit board PCB1 to the second printed circuit board PCB2 via the first film FL1.

Each of the data driving devices 120*a*, 120*b*, 120*c*, 120*d* may be disposed on a second film FL2 in a chip-on-film (COF) way. The second film FL2 may be a support substrate made of a flexible material to connect the second printed circuit board PCB2 and the panel 110. The first communication lines LN1 and the second communication lines LN2 may extend from the second printed circuit board PCB2 respectively to the data driving devices 120*a*, 120*b*, 120*c*, 120*d* via the second films FL2.

A first communication line LN1 may connect the data processing device 140 and each of the plurality of data driving devices 120*a*, 120*b*, 120*c*, 120*d* in a 1:1 way. In other words, a connection of the first communication line LN1 may be a point to point method.

A second communication line LN2 may connect the adjacent two data driving devices 120*a*, 120*b*, 120*c*, 120*d* or the data driving device 120*d* and the data processing device 140 without overlapping the first communication lines LN1 on the plane. For example, a first data driving device 120*a* may be connected with a second data driving device 120*b* through a second communication line LN2 and the second data driving device 120*b* may be connected with a third data driving device 120*c* through a second communication line LN2. Here, the second data driving device 120*b* and the third data driving device 120*c* may respectively be connected with different second printed circuit boards PCB2, and thus, a second communication line LN2 disposed between them may connect them via a second printed circuit board PCB2, the first film FL1, the first printed circuit board PCB1, the first film FL1, and a second printed circuit board PCB2. The third data driving device 120*c* may be connected with a fourth data driving device 120*d* through a second communication line LN2 and the fourth driving device 120*d* may be connected with the data processing device 140 through a second communication line LN2. Such a way of connection of the second communication lines LN2 may be a cascade method.

The data processing device 140 and the plurality of data driving devices 120*a*, 120*b*, 120*c*, 120*d* may perform mutual communications through the first communication lines LN1 and the second communication lines LN2.

In this way, the data processing device 140 may transmit image data signals respectively to the data driving devices 120*a*, 120*b*, 120*c*, 120*d* through the first communication lines LN1.

According to an embodiment, the data processing device 140 may transmit a state reply command signal to a data driving device in order to check a state of the data driving device while transmitting the image data signals to the plurality of data driving devices 120*a*, 120*b*, 120*c*, 120*d*.

The data driving device, among the plurality of data driving devices 120*a*, 120*b*, 120*c*, 120*d*, that receives the state reply command signal through the first communication line LN1, may generate an operation state signal regarding its internal operation state and transmit the operation state signal to the data processing device 140 through the second communication line LN2.

A detailed description in this regard will be followed.

Figure 3:
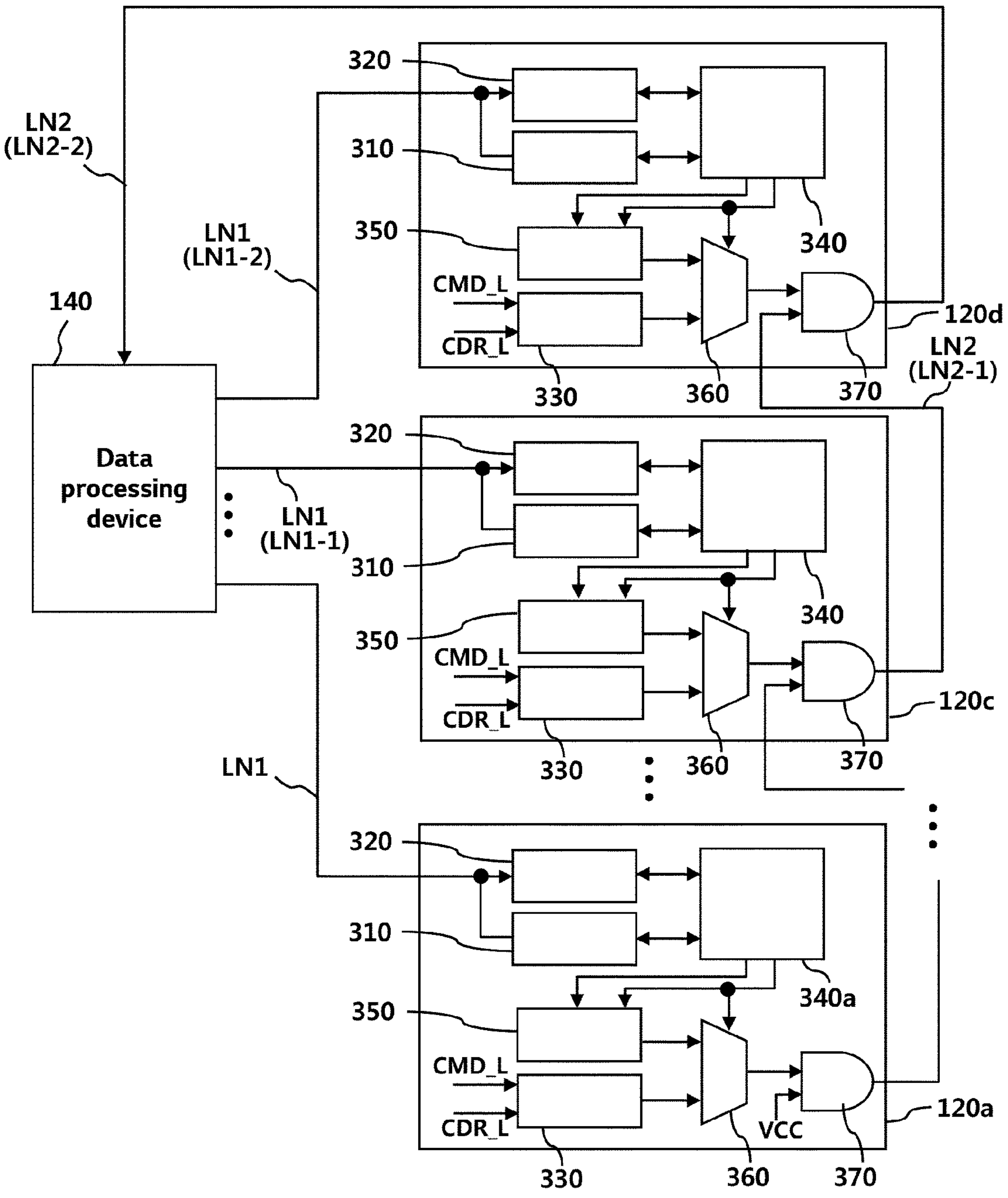
FIG. 3 is a diagram specifically illustrating a configuration of a system according to an embodiment.

FIG. 3 is a diagram specifically illustrating a configuration of a system according to an embodiment.

Referring to FIG. 3, the configuration of a data driving device 120 and the configuration of a system will be described.

A data driving device 120, that is, each of the plurality of data driving devices 120*a*, 120*b*, 120*c*, 120*d*) may comprise a low-speed communication circuit 310, a high-speed communication circuit 320, a lock control circuit 330, a communication control circuit 340, an encoder 350, a signal selecting circuit 360, and a logic gate 370.

The low-speed communication circuit 310 may perform a low-speed communication with the data processing device 140 through a first communication line LN1. Here, a frequency of a low-speed communication may be lower than (specifically, at least 1/10 of) a frequency of a high-speed communication. For example, if the frequency of the high-speed communication is some giga bps, the frequency of the low-speed communication may be some mega bps.

The low-speed communication circuit 310 may receive a clock pattern for a low-speed communication from the data processing device 140 and perform a clock training for the low-speed communication. Here, the low-speed communication circuit 310 may receive the clock pattern for the low-speed communication in a preamble section in FIG. 5.

After completing the clock training for the low-speed communication, the low-speed communication circuit 310 may output a low-speed communication state signal CMD_L of a high level (a high voltage level) indicating a state of a low-speed communication.

After completing the clock training for the low-speed communication, the low-speed communication circuit 310 may receive a set value data signal for a high-speed communication environment from the data processing device 140.

The low-speed communication circuit 310 may process the set value data signal into set value data (for example, decode a signal into data or arrange data) and transmit the set value data to the communication control circuit 340 to be described below. Here, the low-speed communication circuit 120 may receive the set value data signal in a CFG data section in FIG. 5.

The low-speed communication circuit 310 may be activated by control of the communication control circuit 340 when power is applied to the data driving device 120. When a command mode section in FIG. 5, which corresponds to the low-speed communication, is completed, the low-speed communication circuit 310 may be deactivated by the control of the communication control circuit 340.

The high-speed communication circuit 320 may perform a high-speed communication with the data processing device 140 through a first communication line LN1. By the high-speed communication, the high-speed communication circuit 320 may receive an image data signal from the data processing device 140. For example, the high-speed communication circuit 320 may receive an image data signal in a display mode section in FIG. 5.

In addition, the high-speed communication circuit 320 may process the image data signal into image data.

Figure 4:
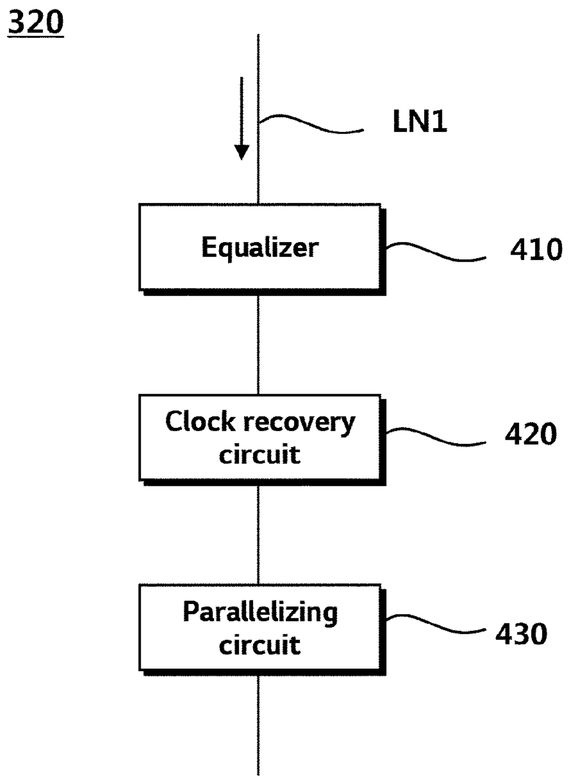
FIG. 4 is a diagram schematically illustrating a configuration of a high-speed communication circuit according to an embodiment.

The high-speed communication circuit 320 may comprise an equalizer 410, a clock recovery circuit 420, and a parallelizing circuit 430 as shown in FIG. 4.

Meanwhile, the high-speed communication circuit 320 may receive a test signal having a frequency of the high-speed communication, that is, a frequency of the image data signal from the data processing device 140 before receiving the image data signal (for example, in a pre-clock training section in FIG. 5).

The high-speed communication circuit 320 may train a clock (TR_CLK in FIG. 5) included in the test signal by changing a set value of an oscillator comprised in the clock recovery circuit 420 every predetermined time Ts by the control of the communication control circuit 340.

Figure 6:
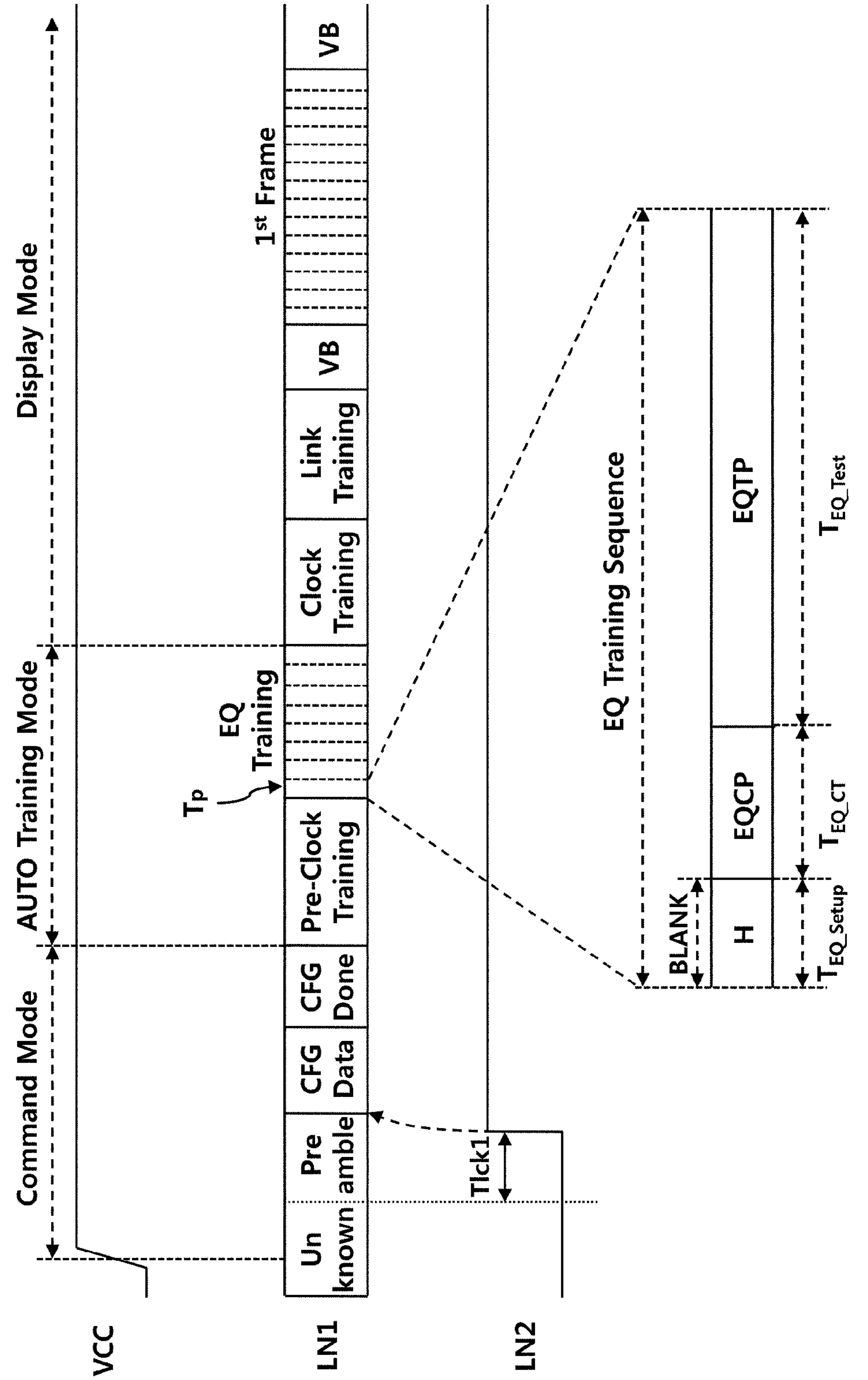

The high-speed communication circuit 320 may also receive an EQ training signal from the data processing device 140 before receiving the image data signal (for example, in an EQ training section in FIG. 6). Here, the EQ training signal may comprise a training sequence repeated every time section as shown in FIG. 6. The training sequence may comprise a blank signal H having a predetermined level (for example, a high level), an EQ clock training signal EQCP disposed after the blank signal, and an EQ test signal EQTP disposed after the EQ clock training signal EQCP. Here, the blank signal H may be to indicate the division of time sections.

The EQ test signal EQTP may comprise a pseudo random binary sequence (PRBS) pattern. Here, the PRBS pattern may be implemented as a PRBS7 pattern, a PRBS9 pattern, a PRBS10 pattern, or the like.

The EQ test signal EQTP may comprise test data encoded in a DC balance code method. Here, the test data encoded in the DC balance code method may comprise a plurality of code groups, each having the same numbers of "0" and "1".

In the high-speed communication circuit 320, the configuration of the equalizer 410 may be changed according to an EQ set value in each of a plurality of time sections during which EQ training signals are received. In the high-speed communication circuit 320, the configuration of the equalizer 410 may be changed in each time section by the control of the communication control circuit 340. Each EQ set value may include a gain level of the equalizer 410 and further include a tab coefficient of the equalizer. The communication control circuit 340 may store a plurality of EQ set values.

According to an embodiment, the high-speed communication circuit 320 may repeatedly perform clock trainings in the pre-clock training section and the EQ training section, and accordingly, may output a high-speed communication state signal CDR_L indicating a state of the high-speed communication by alternating a high level (a high voltage level) and a low level (a low voltage level).

After the EQ training section has passed, the high-speed communication circuit 320 may perform a clock training and a link training, which are general trainings for the high-speed communication. After completing a general clock training, the high-speed communication circuit 320 may output the high-speed communication state signal CDR_L of a high level.

Subsequently, the high-speed communication circuit 320 may receive an image data signal from the data processing device 140. Here, the image data signal may be transmitted or received through a first communication line LN1.

When any clock loss occurs due to an electrostatic discharge (ESD) while the high-speed communication circuit 320 receives the image data signal, the high-speed communication circuit 320 may output the high-speed communication state signal CDR_L of a low level.

Meanwhile, the high-speed communication circuit 320 may receive a state reply command signal from the data processing device 140 while receiving the image data signal.

Figure 7:
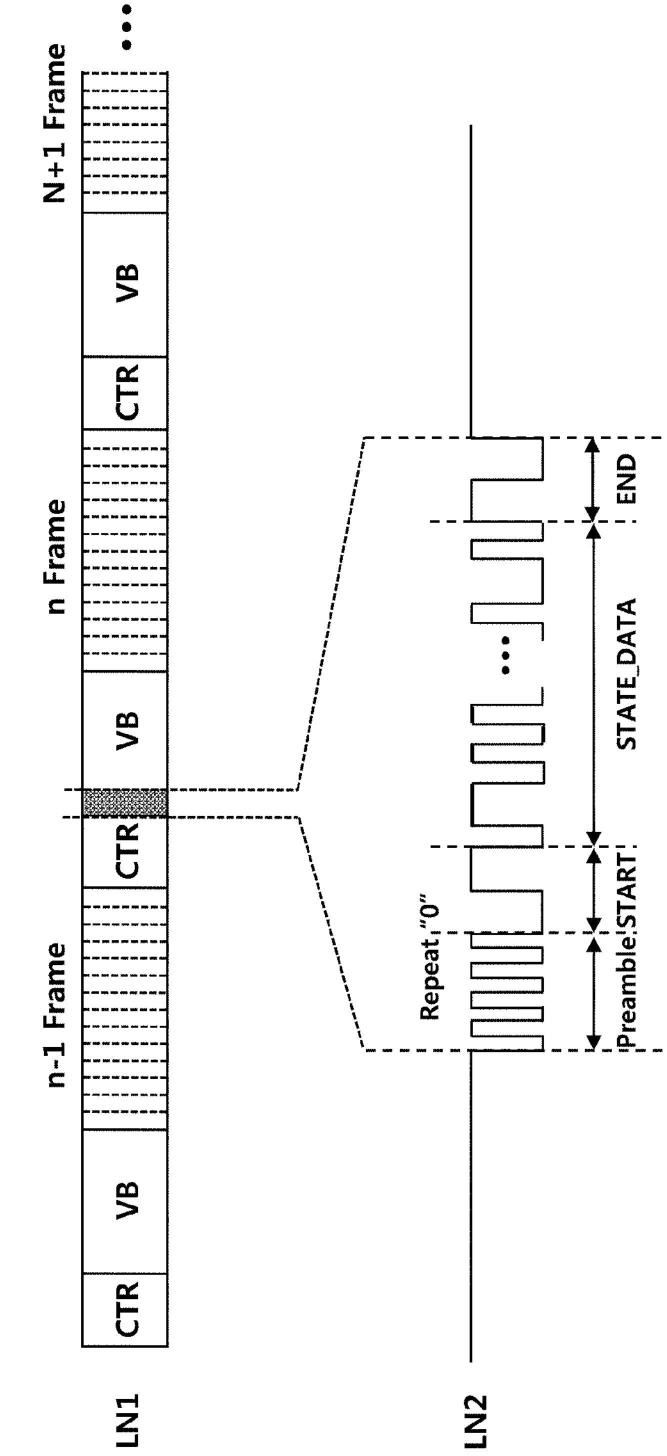
FIG. 7 and FIG. 8 are diagrams illustrating sequences of data transmission through a second communication line according to an embodiment.
Figure 8:
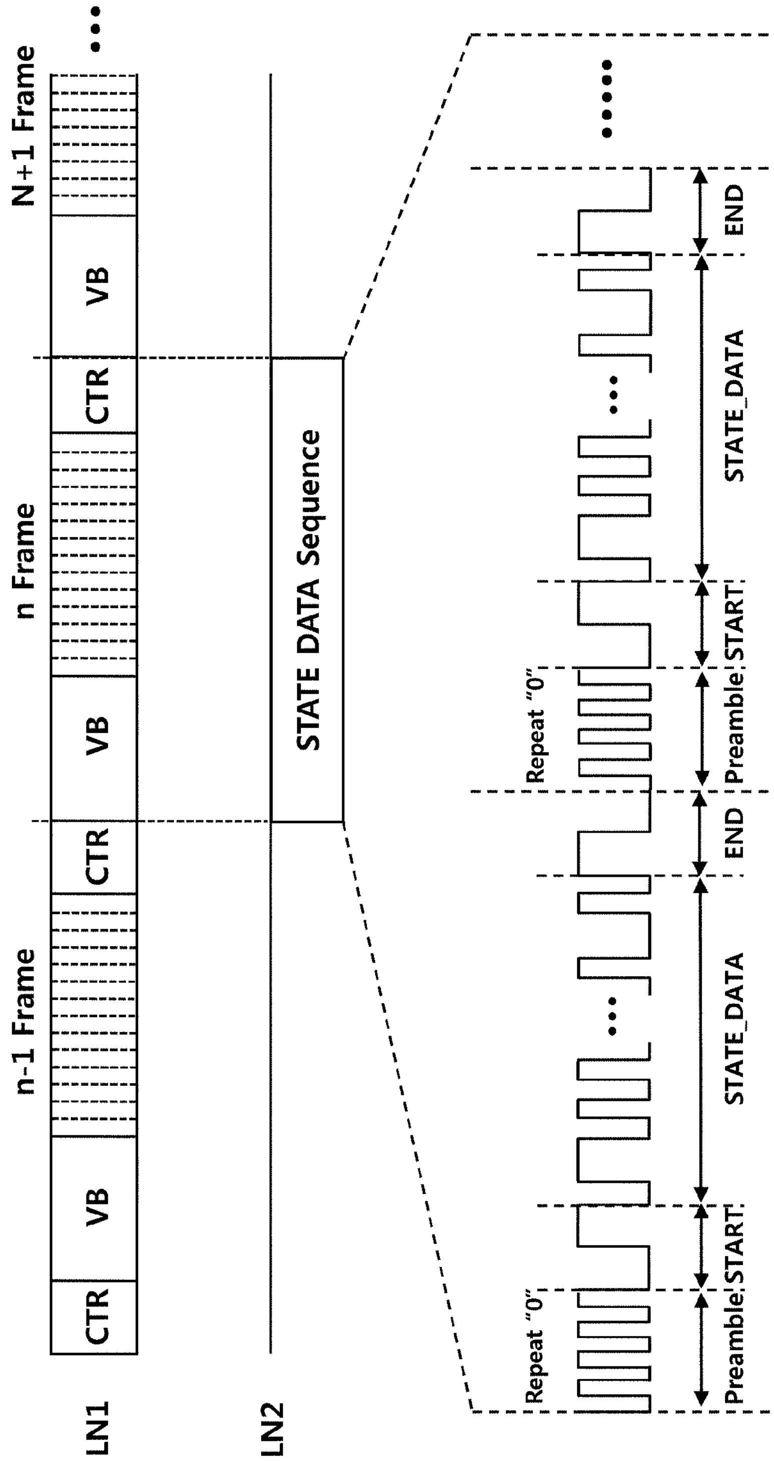

Here, the high-speed communication circuit 320 may receive an image data signal by frame and receive a state reply command signal in a frame control section CRT between one frame (for example, n−1 frame, n is a natural number in FIG. 7 or FIG. 8) and another frame (for example, n frame in FIG. 7 or FIG. 8) as shown in FIG. 7 or FIG. 8.

In other words, a state reply command signal may be included in a frame control signal that the high-speed communication circuit 320 receives in a frame control section CTR.

The high-speed communication circuit 320 may receive a reply end command signal in another frame control section CTR coming after the aforementioned frame control section CTR.

The high-speed communication circuit 320 may process the state reply command signal into state reply command information to transmit it to the communication control circuit 340 and process a reply end command signal into reply end command information to transmit it to the communication control circuit 340.

According to an embodiment, the high-speed communication circuit 320 may receive a level fixation command signal instead of the state reply command signal in a frame control section CTR.

When having received a level fixation command signal in a frame control section CTR, the high-speed communication circuit 320 may receive a fixation release command signal in another frame control section CTR after the aforementioned frame control section CTR. Here, a level fixation command signal as well as a fixation release command signal may be comprised in a frame control signal.

The high-speed communication circuit 320 may process the level fixation command signal and the fixation release command signal respectively into level fixation command information and fixation release command information to transmit them to the lock control circuit 330.

According to an embodiment, when the low-speed communication circuit 310 is activated, the high-speed communication circuit 320 may be deactivated by the control of the communication control circuit 340. On the contrary, when the low-speed communication circuit 310 is deactivated, the high-speed communication circuit 320 may be activated by the control of the communication control circuit 340.

The lock control circuit 330 may receive a low-speed communication state signal CMD_L from the low-speed communication circuit 310 and a high-speed communication state signal CDR_L from the high-speed communication circuit 320.

When the low-speed communication circuit 310 completes a clock training for the low-speed communication, the lock control circuit 330 may receive a low-speed communication state signal CMD_L of a high level from the low-speed communication circuit 310 and a high-speed communication state signal CDR_L of a low level from the high-speed communication circuit 320.

In this case, the lock control circuit 330 may output a lock signal of a first level as shown in FIG. 5 or FIG. 6. Here, the first level may be high.

When the low-speed communication between the low-speed communication circuit 310 and the data processing device is completed, the lock control circuit 330 may receive a low-speed communication state signal CMD_L of a low level from the low-speed communication circuit 310.

Meanwhile, in a case when a high-speed communication section comprises a pre-clock training section and an EQ training section, the lock control circuit 330 may receive a high-speed communication state signal CDR_L, in which high levels and low levels alternate, from the high-speed communication circuit 320 and a low-speed communication state signal CMD_L of a low level from the low-speed communication circuit 310.

In this case, the lock control circuit 330 may consistently output a lock signal of the first level as shown in FIG. 5 or FIG. 6. The reason is that, if the level of a lock signal is frequently changed according to the level change of a high-speed communication state signal CDR_L, it increases the probability of errors in the transmission of a lock signal.

When the high-speed communication circuit 320 completes a general clock training, the lock control circuit 330 may receive a high-speed communication state signal CDR_L of a high level from the high-speed communication circuit 320 and a low-speed communication state signal CMD_L of a low level from the low-speed communication circuit 310.

In this case, the lock control circuit 330 may consistently output a lock signal of the first level as shown in FIG. 5 or FIG. 6.

Even in a case when the high-speed communication circuit 320 receives a state reply command signal while receiving an image data signal, the lock control circuit 330 may also consistently output a lock signal of the first level.

The lock control circuit 330 may receive level fixation command information from the high-speed communication circuit 320. In this case, the lock control circuit 330 may output a lock signal having a level fixed to the first level.

Meanwhile, in a case when any clock loss occurs due to an electrostatic discharge (ESD) after the high-speed communication circuit 320 has received the level fixation command signal, the signal processing of the high-speed communication circuit 320 may abnormally be performed.

In this case, the high-speed communication circuit 320 may fail to intactly receive a fixation release command signal or to process the fixation release command signal into fixation release command information.

At this moment, the lock control circuit 330 may receive a high-speed communication state signal CDR_L of a low level from the high-speed communication circuit 320. Then, the lock control circuit 330 may change the lock signal from the fixed first level to a second level according to the level change of the high-speed communication state signal CDR_L and output it.

In other words, in a case when the lock control circuit 330 receives only a high-speed communication state signal CDR_L of a low level, not fixation release command information in a state where the lock control circuit 330 fixes the level of a lock signal to be a first level by level fixation command information, the lock control circuit 330 may disregard the level fixation command information and change the level of the lock signal to a second level to output it. Here, if the first level is high, the second level may be low.

According to an embodiment, in a case when one of the low-speed communication circuit 310 and the high-speed communication circuit 320 is activated and the other is deactivated, the lock control circuit 330 may receive a state signal CMD_L or CDR_L of only an activated circuit and output a lock signal using the state signal of only the activated circuit.

For example, in a case when the low-speed communication circuit 310 is activated and the high-speed communication circuit 320 is deactivated, the lock control circuit 330 may receive only a low-speed communication state signal CMD_L from the low-speed communication circuit 310 and output a lock signal of the same level as that of the low-speed communication state signal CMD_L.

The communication control circuit 340 may control the low-speed communication circuit 310 and the high-speed communication circuit 320.

Specifically, the communication control circuit 340 may set up set values for components comprised in the high-speed communication circuit 320 according to set value data transmitted from the low-speed communication circuit 310.

In a case when the high-speed communication circuit 320 receives a test signal including a clock TR_CLK in FIG. 5, the communication control circuit 340 may change a set value of an oscillator comprised in the clock recovery circuit 420 every predetermined time. For this, the communication control circuit 340 may store a plurality of set values of the oscillator.

Whenever changing the set value of the oscillator at every predetermined time, the communication control circuit 340 may check a training result of a clock TR_CLK of a test signal by the low-speed communication circuit 310 at every predetermined time and determine an optimum set value for a frequency of the high-speed communication, that is a frequency of an image data signal according to the training result at every predetermined time.

In other words, before receiving an image data signal from the high-speed communication circuit 320, the communication control circuit 340 may optimize a set value of the clock recovery circuit 420 comprised in the high-speed communication circuit 320 according to a frequency of the image data signal. Here, an optimized set value may be a set value of the oscillator and the optimized set value may comprise one of a reference current value, a reference voltage value, and a gain adjustment value of the oscillator.

In a case when the high-speed communication circuit 320 receives an EQ training signal as shown in FIG. 6, the communication control circuit 340 may change configuration of the equalizer 410 in respective time sections Tp according to a plurality of EQ set values during a plurality of time sections in which the high-speed communication circuit 320 receives the EQ training signal. Here, each of the plurality of EQ set values may comprise a gain level of the equalizer 410 and may further comprise a tab coefficient of the equalizer 410. The plurality of EQ set values may be comprised in set value data and the communication control circuit 340 may extract a plurality of EQ set values from previously stored set value data to change the configuration of the equalizer 410 in every time section Tp.

Meanwhile, when the high-speed communication circuit 320 receives a state reply command signal while receiving an image data signal, the communication control circuit 340 may receive state reply command information from the high-speed communication circuit 320.

In this way, the communication control circuit 340 may generate operation state data regarding an operation state inside the data driving device 120. Here, the operation state data may comprise set value data transmitted from the low-speed communication circuit 310, a set value of the clock recovery circuit 420 optimized in the pre-clock training section, and a set value of the equalizer 410 optimized in the EQ training section. The operation state data may further comprise the number of decoding errors regarding an image data signal, frame control data comprised in a frame control signal, or the like.

In a case when the data processing device 140 encodes an image data signal using an 8B10B code, the number of decoding errors may be the number of errors when the image data signal is decoded using the 8B10B code.

The communication control circuit 340 may calculate a checksum for the operation state data after generating the operation state data and include the checksum in a header area of the operation state data.

In other words, the operation state data may further comprise a checksum.

When generating the operation state data, the communication control circuit 340 may output an operation control signal of a high level to the encoder 350 and the signal selecting circuit 360.

In addition, the communication control circuit 340 may transmit the operation state data to the encoder 350.

Here, the communication control circuit 340 may generate an operation state data only once.

The communication control circuit 340 may also repeatedly generate the operation state data during a predetermined time.

For example, in a case when the high-speed communication circuit 320 receives a state reply command signal in a frame control section between one frame (n-1 frame) and another frame (n frame) as shown in FIG. 8, the communication control circuit 340 may generate N (N is a natural number) pieces of operation state data from right after receiving the state reply command signal until another frame control section disposed after the n frame. The communication control circuit 340 may receive reply end command information from the high-speed communication circuit 320 in the frame control section disposed after the n frame. By the reply end command information, the communication control circuit 340 may end the generation of the operation state data.

In addition, the communication control circuit 340 may output an operation control signal of a low level to the encoder 350 and the signal selecting circuit 360.

In a case when the encoder 350 receives an operation control signal of a high level from the communication control circuit 340, the encoder 350 may be activated.

Figure 9A:
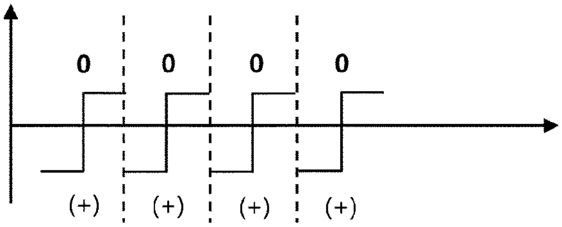
FIGS. 9A and 9B are diagrams illustrating an encoding method of a data driving device according to an embodiment.
Figure 9B:
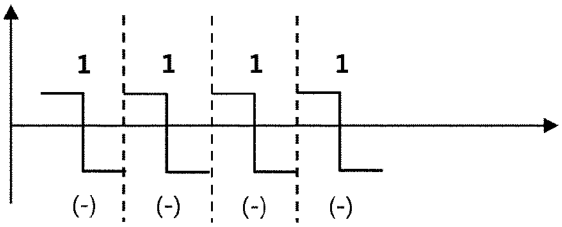

Subsequently, the encoder 350 may encode the operation state data transmitted from the communication control circuit 340 into an operation state signal. Here, the encoder 350 may use a Manchester code to encode the operation state data into the operation state signal. When the operation state data is encoded using the Manchester code, the operation state signal may have a pulse change in every bit as shown in FIGS. 9A and 9B and this may allow easily identifying synchronization timings in the data processing device 140, which is a receiving side. For example, if a data bit corresponding to a binary numeral "0" is repeated as shown in FIG. 9A or even if a data bit corresponding to a binary numeral "1" is repeated as shown in FIG. 9B, the voltage level may be changed in a middle position of every data bit.

Accordingly, the data processing device 140 may easily identify synchronization timings in an operation state signal encoded using the Manchester code even when a transmission frequency of the data driving device 120 is changed.

Such an operation state signal may comprise a preamble in which the Manchester code corresponding to any one of the binary numerals is repeated M (M is a natural number equal to or higher than 2) times, a start bit disposed after the preamble, operation state data disposed after the start bit, and an end bit disposed after the operation state data.

In a case when the communication control circuit 340 generates operation state data only once, an operation state signal encoded by the encoder 350 may be as shown in FIG. 7. In a case when the communication control circuit 340 repeatedly generates operation state data during a predetermined time, an operation state signal encoded by the encoder 350 may be as shown in FIG. 8. In the operation state signal, pieces, each comprising a preamble, a start bit, operation state data, and an end bit, may be repeated N times.

In a case when the encoder 350 receives an operation control signal of a low level from the communication control circuit 340 after encoding the operation state data, the encoder 350 may be deactivated.

When receiving only a lock signal from the lock control circuit 330, the signal selecting circuit 360 may output the lock signal to the logic gate 370. Here, the lock signal may have the first level.

When receiving the operation state signal from the encoder 350 and the lock signal from the lock control circuit 330, the signal selecting circuit 360 may output the operation state signal to the logic gate 370 by the control of the communication control circuit 340.

In other words, in a case when the signal selecting circuit 360 receives an operation control signal of a low level from the communication control circuit 340, the signal selecting circuit 360 may select a signal input and output path for the lock control circuit 330.

In a case when the signal selecting circuit 360 receives an operation control signal of a high level from the communication control circuit 340, the signal selecting circuit 360 may select a signal input and output path for the encoder 350.

The signal selecting circuit 360 may be a multiplexer to select one of a plurality of input signals to output it.

The logic gate (370) may transmit a lock signal of the first level to the second communication line LN2 connected with its output terminal, and subsequently, an operation state signal to the second communication line LN2 connected with its output terminal.

In other words, when the logic gate 370 receives a lock signal of the first level through its one input terminal from the signal selecting circuit 360 and a lock signal of the first level from an external device through the second communication line LN2 connected with its other input terminal, the logic gate 370 may perform a logical operation with respect to the lock signal of the first level and the lock signal from the external device and transmit a lock signal of the first level obtained by this logical operation to the second communication line LN2 connected with its output terminal.

When the logic gate 370 receives an operation state signal through its one input terminal from the signal selecting circuit 360 and a lock signal of the first level from an external device through the second communication line LN2 connected with its other input terminal, the logic gate 370 may perform a logical operation with respect to the operation state signal and the lock signal of the first level from the external device and transmit a signal obtained by this logical operation to the second communication line LN2 connected with its output terminal. Here, the first level may be high and the lock signal of the first level from the external device may be transmitted from a logic gate of another adjacent data driving device. The logic gate 370 may be an AND gate to perform an AND operation.

In a case when the first level is low, the logic gate 370 may be an OR gate to perform an OR operation.

When the logic gate 370 receives an operation state signal through its one input terminal from the signal selecting circuit 360 and a lock signal of the second level from an external device through the second communication line LN2 connected with its other input terminal, the logic gate 370 may perform a logical operation with respect to the operation state signal and the lock signal of the second level from the external device and transmit a lock signal of the second level from the external device obtained by this logical operation to the second communication line LN2 connected with its output terminal. Here, the second level may be low.

Thus far, the configuration of the data driving device 120 was described.

Hereinafter, a configuration of a system according to an embodiment will be described.

Referring to FIG. 3, the data processing device 140 and each of the plurality of data driving devices 120*a*, 120*b*, 120*c*, 120*d* may be connected in a point-to-point way through a first communication line LN1.

The data processing device 140 may transmit image data signals respectively to the plurality of data driving devices 120*a*, 120*b*, 120*c*, 120*d* through the first communication lines LN1 and may sequentially check states of the plurality of data driving devices 120*a*, 120*b*, 120*c*, 120*d* while transmitting the image data signals.

For example, in order that the data processing device 140 checks an operation state of a data driving device 120*c* according to a predetermined order while transmitting image data signals respectively to the plurality of data driving devices 120*a*, 120*b*, 120*c*, 120*d*, the data processing device 140 may transmit a state reply command signal to the data driving device 120*c* in a frame control section CTR after the n−1 frame as shown in FIG. 7 or FIG. 8. Here, the data processing device 140 may transmit the state reply command signal to the data driving device 120*c* through a 1-1st communication line LN1-1, which is a first communication line LN1 connected with the data driving device 120*c*.

At this moment, the data processing device 140 may transmit level fixation command signals instead of a state reply command signal to the other data driving devices 120*a*, 120*b*, 120*d*.

The other data driving devices 120*a*, 120*b*, 120*d* having received the level fixation command signals may fix lock signals, to be transmitted through the second communication lines LN2, in the first level. Here, the first level may be high.

The data driving device 120*c* having received the state reply command signal from the data processing device 140 may generate an operation state signal including operation state data indicating its internal operation state. Here, the operation state signal may be a signal encoded using the Manchester code.

Subsequently, the data driving device 120*c* may transmit the operation state signal instead of a lock signal of the first level, which was being transmitted, through a 2-1st communication line LN2-1 connected with another data driving device 120*d*. Here, the data driving device 120*c* may also receive a lock signal of the first level from another data driving device 120*b*, perform a logical operation with respect to the operation state signal and the lock signal of the first level, and transmit an operation state signal obtained by this logical operation through the 2-1st communication line LN2-1. According to an embodiment, a logical operation may be an AND operation or an OR operation.

According to an embodiment, when the data driving device 120*c* transmits the operation state signal through the 2-1st communication line LN2-1, the other data driving device 120*d* may fix a lock signal in the first level by the level fixation command signal received from the data processing device 140.

In this state, the data driving device 120*d* may perform a logical operation with respect to the operation state signal received from the data driving device 120*c* through the 2-1st communication line LN2-1 and the lock signal of its own.

In this way, the data driving device 120*d* may transmit the operation state signal of the data driving device 120*c* through a 2-2nd communication line LN2-2.

The data processing device 140 may check the operation state by receiving the operation state signal of the data driving device 120*c* through the 2-2nd communication line LN2-2 and processing the operation state signal into operation state data and store the operation state data of the data driving device 120*c*.

Here, the operation state data may comprise a set value of the clock recovery circuit 420 optimized in the pre-clock training section and a set value of the equalizer 410 optimized in the EQ training section. In addition, the operation state data may further comprise the number of decoding errors of an image data signal, frame control data comprised in a frame control signal, or the like.

According to an embodiment, when the operation state data further comprises a checksum, the data processing device 140 may determine whether or not there are any errors in the operation state data using the checksum.

In a case when the data processing device 140 determines errors of the operation state data using the checksum, the data processing device 140 may transmit again a state reply command signal to the data driving device 120*c* and level fixation command signals to the data driving devices 120*a*, 120*b*, 120*d*.

Meanwhile, in a case when the operation state signal comprises pieces, each comprising a preamble, a start bit, operation state data, and an end bit, repeated N times as shown in FIG. 8. and the operation state data includes the number of decoding errors, the data processing device 140 may check in real time a decoding error rate of an image data signal transmitted to the data driving device 120*c*, and accordingly, may perform an operation to reduce the decoding error rate of an image data signal. For example, the data processing device 140 may apply an encoding method to reduce a decoding error rate when encoding an image data signal.

In this way, the data processing device 140 may check and store operation state data of each of the plurality of data driving devices 120*a*, 120*b*, 120*c*, 120*d*.

In a case when any clock loss occurs due to an electro static discharge (ESD) in at least on of the plurality of data driving devices 120*a*, 120*b*, 120*c*, 120*d* after the data processing device 140 has stored operation state data of each of the plurality data driving devices 120*a*, 120*b*, 120*c*, 120*d* while the display device 100 is being driven, a lock signal received by the data processing device 140 may have the second level. In this case, the data processing device 140 and the plurality of driving devices 120*a*, 120*b*, 120*c*, 120*d* need to perform a clock recovery process. Here, the clock recovery process may mean a process from a preamble section in a command mode section to a link training section in a display mode section in FIG. 5 or FIG. 6.

According to an embodiment, during the clock recovery process, the data processing device 140 may include an optimum set value of the clock recovery circuit 420 and an optimum value of the equalizer 410, included in operation state data of the corresponding data driving device, in set value data and transmit such set value data to the corresponding data driving device in the command mode section. As such, the pre-clock training section and the EQ training section may be omitted during the clock recovery process.

Meanwhile, in a case when any clock loss occurs due to the ESD or the like in at least one of the remaining data driving devices 120*a*, 120*b*, 120*d* which respectively have received the level fixation command signals, the at least one data driving device may not normally receive signals from the data processing device 140 and may not normally process the signals, and accordingly, may not normally perceive fixation release command signals.

In this case, the at least one driving device may keep a lock signal to be fixed in the first level even when there is a clock loss, and therefore, the data processing device 140 may not identify that there is an abnormality in the at least one data driving device.

According to an embodiment, in order to prevent such a situation, in a case when there is any clock loss in at least one of the remaining data driving devices 120*a*, 120*b*, 120*d*, which respectively have received the level fixation command signals, the at least one data driving device may disregard the level fixation command signals and change the level of a lock signal to the second level.

Here, the data processing device 140 may not receive an operation state signal from the one data driving device 120*c*, but may receive a lock signal of the second level from another data driving device 120*d*.

In this case, the data processing device 140 may transmit reset signals, each being maintained in the first level or the second level for a predetermined time, to the plurality of driving devices 120*a*, 120*b*, 120*c*, 120*d* through the first communication lines LN1. In this way, the data processing device 140 and the plurality of data driving devices 120*a*, 120*b*, 120*c*, 120*d* may perform the clock recovery process. Here, the data processing device 140 may sequentially transmit the reset signals respectively to the plurality of data driving devices 120*a*, 120*b*, 120*c*, 120*d*.

According to an embodiment, in a case when the data processing device 140 initially transmits a state reply command signal to one data driving device 120*c* and does not receive an operation state signal of the one data driving device 120*c* within a predetermined time, the data processing device 140 may transmit at least once again the state reply command signal to the one data driving device 120*c*.

In a case when the data processing device 140 does not receive an operation state signal from the data driving device 120*c* even after having transmitted at least once again the state reply command signal to the data driving device 120*c*, the data processing device 140 may transmit reset signals as described above to the plurality of data driving devices 120*a*, 120*b*, 120*c*, 120*d* to perform the clock recovery process in the plurality of data driving devices 120*a*, 120*b*, 120*c*, 120*d*.

As described above, since the data processing device 140 may check operation states of the respective data driving devices 120*a*, 120*b*, 120*c*, 120*d* when the display device 100 is driven, the data processing device 140 may efficiently manage the plurality of data driving devices 120*a*, 120*b*, 120*c*, 120*d*.

Hereinafter, there will be described a data transmission and reception process of one data driving device 120*c*, among the plurality of data driving devices 120*a*, 120*b*, 120*c*, 120*d*, which receives a state reply command signal from the data processing device 140.

Figure 10:
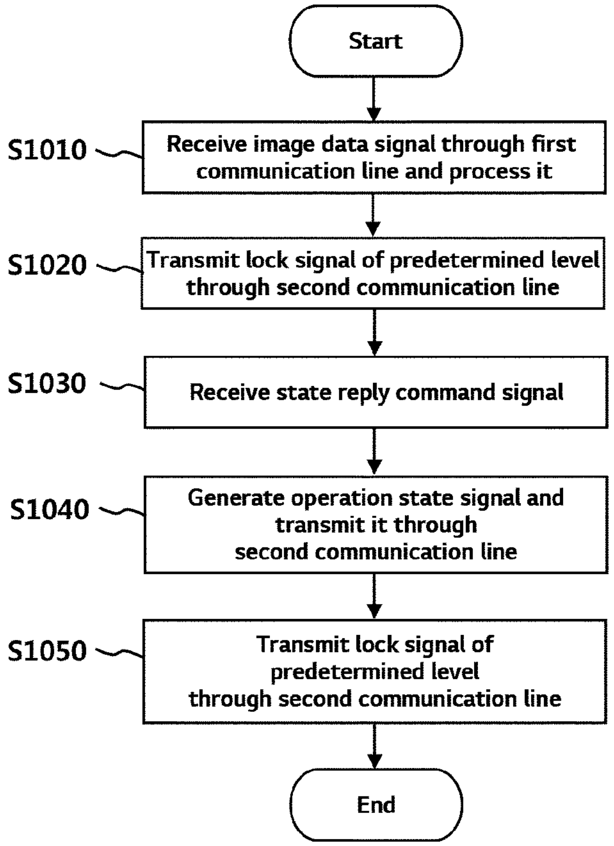
FIG. 10 is a flow diagram illustrating a process of a data driving device transmitting and receiving data according to an embodiment.

FIG. 10 is a flow diagram illustrating a process of a data driving device transmitting and receiving data according to an embodiment.

The one data driving device 120*c* may receive an image data signal through the 1-1st communication line, which is a first communication line, connected with the data processing device 140 (S1010). Here, the image data signal may be divided by frame.

When receiving the image data signal, the one data driving device 120*c* may transmit a lock signal of a predetermined level, that is, a first level through the 2-1st communication line (S1020). Here, the first level may be high.

The one data driving device 120*c* may receive a state reply command signal from the data processing device 140 while receiving the image data signal by frame (S1030). The one data driving device 120*c* may receive the state reply command signal in a frame control section disposed between one frame and another frame of the image data signal.

The one data driving device 120*c*, which has received the state reply command signal, may generate an operation state signal including operation state data regarding its internal operation and transmit the operation state signal instead of the lock signal of a predetermined level through the 2-1st communication line (S1040). Here, the operation state signal may be a signal encoded using the Manchester code.

After S1040, the one data driving device 120*c* may transmit again a lock signal of a predetermined level through the 2-1st communication line (S1050).

According to an embodiment, before S1010, the one data driving device 120*c* may optimize a set value of the clock recovery circuit, comprised in the high-speed communication circuit which receives an image data signal, according to a frequency of the image data signal. Here, an optimized set value of the clock recovery circuit may comprise one of a reference current value, a reference voltage value, and a gain adjustment value of an oscillator comprised in the clock recovery circuit and the operation state data may include the optimized set value of the clock recovery circuit.

Before S1010, the one data driving device 120*c* may optimize a set value of the equalizer 410 comprised in the high-speed communication circuit according to a characteristic of the 1-1st communication line. Here, an optimized set value of the equalizer may comprise a gain level of the equalizer and the operation state data may include the optimized set value of the equalizer.

In S1040, the one data driving device 120*c* may repeatedly generate and transmit operation state signals for a predetermined time.

In S1050, the one data driving device 120*c* may receive a reply end command signal in another frame control section coming after the aforementioned frame control section. The one data driving device may stop generating and transmitting the operation state signals by the reply end command signal and transmit again a lock signal of a predetermined level.

In S1040, the one data driving device 120*c* may perform an AND operation with respect to a lock signal of a predetermined level received from an external device (for example, another data driving device 120*b*) and an operation state signal and transmit an operation state signal obtained by the AND operation through the 2-2nd communication line.

What is claimed is:

1. A method of driving a data driving device, comprising:

an image receiving step to receive an image data signal from a data processing device through a first communication line;

a first transmission step to transmit a lock signal of a predetermined level through a second communication line, wherein the second communication line is connected with the data driving device, another data driving device, and the data processing device, and wherein the data driving device, the another data driving device, and the data processing device are connected in series through the second communication line;

a command receiving step to receive a state reply command signal from the data processing device while receiving the image data signal; and a second transmission step to transmit an operation state signal including operation state data representing an operation state inside the data driving device, instead of the lock signal of the predetermined level, through the second communication line.

2. The method of claim 1, further comprising, before the image receiving step, a step of optimizing a set value of a clock recovery circuit, comprised in a circuit to receive the image data signal, according to a frequency of the image data signal.

3. The method of claim 2, wherein the optimized set value comprises any one of a reference current value, a reference voltage value, and a gain adjustment value of an oscillator comprised in the clock recovery circuit, and the operation state data comprises the optimized set value.

4. The method of claim 1, further comprising, before the image receiving step, a step of optimizing a set value of an equalizer, comprised in a circuit to receive the image data signal, according to a characteristic of the first communication line.

5. The method of claim 4, wherein the optimized set value comprises a gain level of the equalizer and the operation state data comprises the optimized set value.

6. The method of claim 1, comprising, in the command receiving step, receiving the image data signal by frame and the state reply command signal in a frame control section between a frame and another frame.

7. The method of claim 6, comprising repeatedly performing the second transmission step N times from right after receiving the state reply command signal until another frame control section starts and subsequently transmitting again the lock signal of the predetermined level through the second communication line, wherein N is a natural number.

8. The method of claim 1, comprising, in the second transmission step, encoding the operation state data into the operation state signal using a Manchester code.

9. The method of claim 8, wherein the operation state signal comprises a preamble in which the Manchester code corresponding to any one of binary numerals is repeated M, a start bit disposed after the preamble, the operation state data disposed after the start bit, and an end bit disposed after the operation state data, and wherein M is a natural number equal to or greater than 2.

10. The method of claim 1, comprising:

in the second transmission step, performing an AND operation with respect to the lock signal of the predetermined level received from an external device and the operation state signal; and transmitting the operation state signal obtained by the AND operation through the second communication line.

11. A data driving device comprising:

a communication circuit configured to receive an image data signal from a data processing device through a first communication line, to receive a state reply command signal from the data processing device while receiving the image data signal, and to process the state reply command signal into state reply command information;

a lock control circuit configured to output a lock signal of a first level when the communication circuit receives the image data signal; and a logic gate configured to transmit an operation state signal regarding an operation state of the communication circuit, instead of the lock signal of the first level, through a second communication line connected with an output terminal when receiving the state reply command information from the communication circuit, wherein the second communication line is connected with the data driving device, another data driving device, and the data processing device, and wherein the data driving device, the another data driving device, and the data processing device are connected in series through the second communication line.

12. The data driving device of claim 11, further comprising a signal selecting circuit configured to output the lock signal of the first level to the logic gate when only the lock signal of the first level is inputted and to output the operation state signal to the logic gate when the operation state signal and the lock signal of the first level are inputted.

13. The data driving device of claim 12, wherein the logic gate is an AND gate, and wherein, when receiving the operation state signal from the signal selecting circuit through an input terminal and receiving the lock signal of the first level from an external device through the second communication line connected with another input terminal, the AND gate is configured to perform an AND operation with respect to the operation state signal and the lock signal and transmit an operation state signal obtained by the AND operation through the second communication line connected with the output terminal.

14. The data driving device of claim 12, wherein the logic gate is an AND gate, and wherein, when receiving the operation state signal from the signal selecting circuit through an input terminal and receiving a lock signal of a second level from an external device through the second communication line connected with another input terminal, the AND gate is configured to perform an AND operation with respect to the operation state signal and the lock signal and transmit a lock signal obtained by the AND operation through the second communication line connected with the output terminal.

15. The data driving device of claim 11, further comprising a communication control circuit, wherein the communication circuit comprises a clock recovery circuit and an equalizer, and the communication control circuit is configured to optimize a set value of an oscillator comprised in the clock recovery circuit according to a frequency of the image data signal before the communication circuit receives the image data signal and is configured to optimize a gain level of the equalizer according to a characteristic of the first communication line.

16. The data driving device of claim 15, wherein the operation state signal comprises the set value of the oscillator and the gain level of the equalizer.

17. A system comprising:

a first data driving device configured to receive a first image data signal through a 1-1st communication line, to transmit a first lock signal through a 2-1st communication line, and to transmit an operation state signal representing an operation state inside the first data driving device, instead of the first lock signal through the 2-1st communication line, when receiving a state reply command signal while receiving the first image data signal;

a second data driving device configured to receive a second image data signal through a 1-2nd communication line, to generate a second lock signal, to receive the first lock signal through the 2-1st communication line, to perform a logical operation with respect to the first lock signal and the second lock signal, to transmit a signal obtained by the logical operation through a 2-2nd communication line, to receive the operation state signal through the 2-1st communication line, to perform a logical operation with respect to the operation state signal and the second lock signal, and to transmit a second operation state signal obtained by the logical operation through the 2-2nd communication line; and a data processing device configured to transmit the first image data signal through the 1-1st communication line, the second image data signal through the 1-2nd communication line, and the state reply command signal through the 1-1st communication line and subsequently to receive the second operation state signal through the 2-2nd communication line.

18. The system of claim 17, wherein the data processing device configured to transmit a level fixation command signal to fix a level of the second lock signal through the 1-2nd communication line when transmitting the state reply command signal through the 1-1st communication line.

19. The system of claim 18, wherein the second data driving device is configured to fix the level of the second lock signal to be high when receiving the level fixation command signal through the 1-2nd communication line.

20. The system of claim 19, wherein the second data driving device is configured to change the level of the second lock signal to be low when there is an error in receiving the second image data signal in a state where the lock signal is fixed in a high level, to perform a logical operation with respect to the operation state signal and the second lock signal of a low level, and to transmit a signal of a low level obtained by the logical operation through the 2-2nd communication line.

* * * * *